June 5, 1928.
H. F. SOWLE
1,672,697
COMBINATION BED AND COUCH
Filed Aug. 10, 1925   2 Sheets-Sheet 2
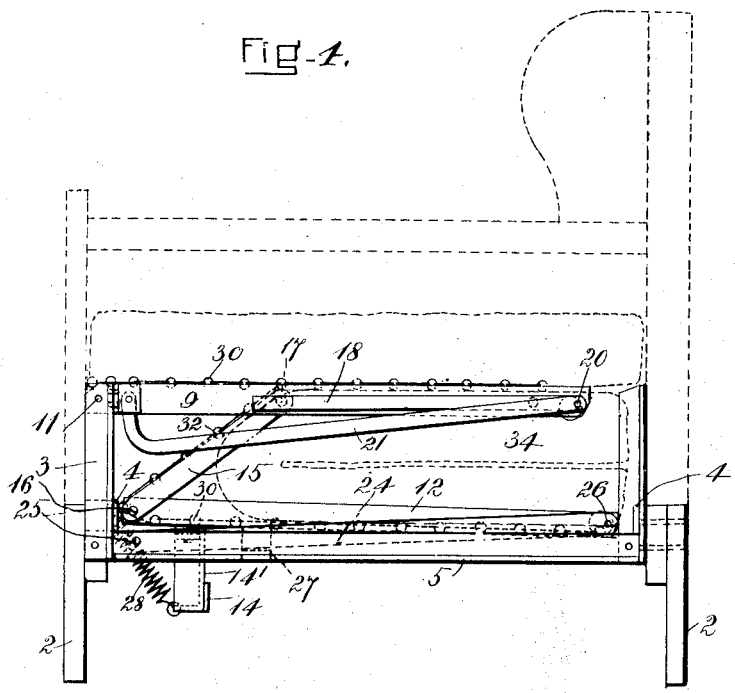
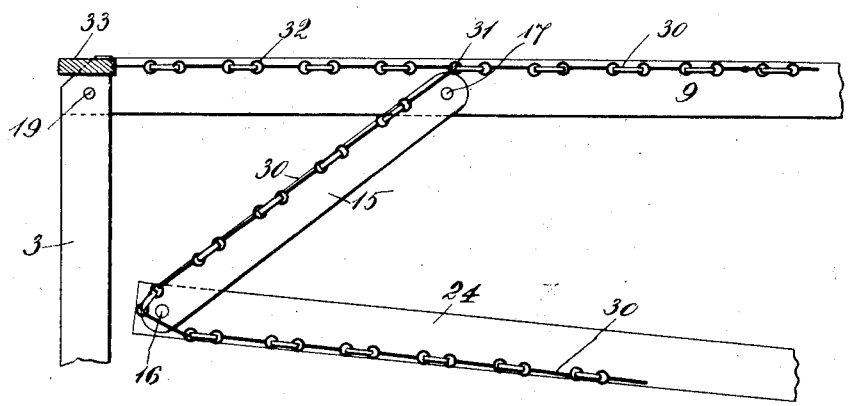
INVENTOR=
Herbert F. Sowle
BY
ATTORNEYS=

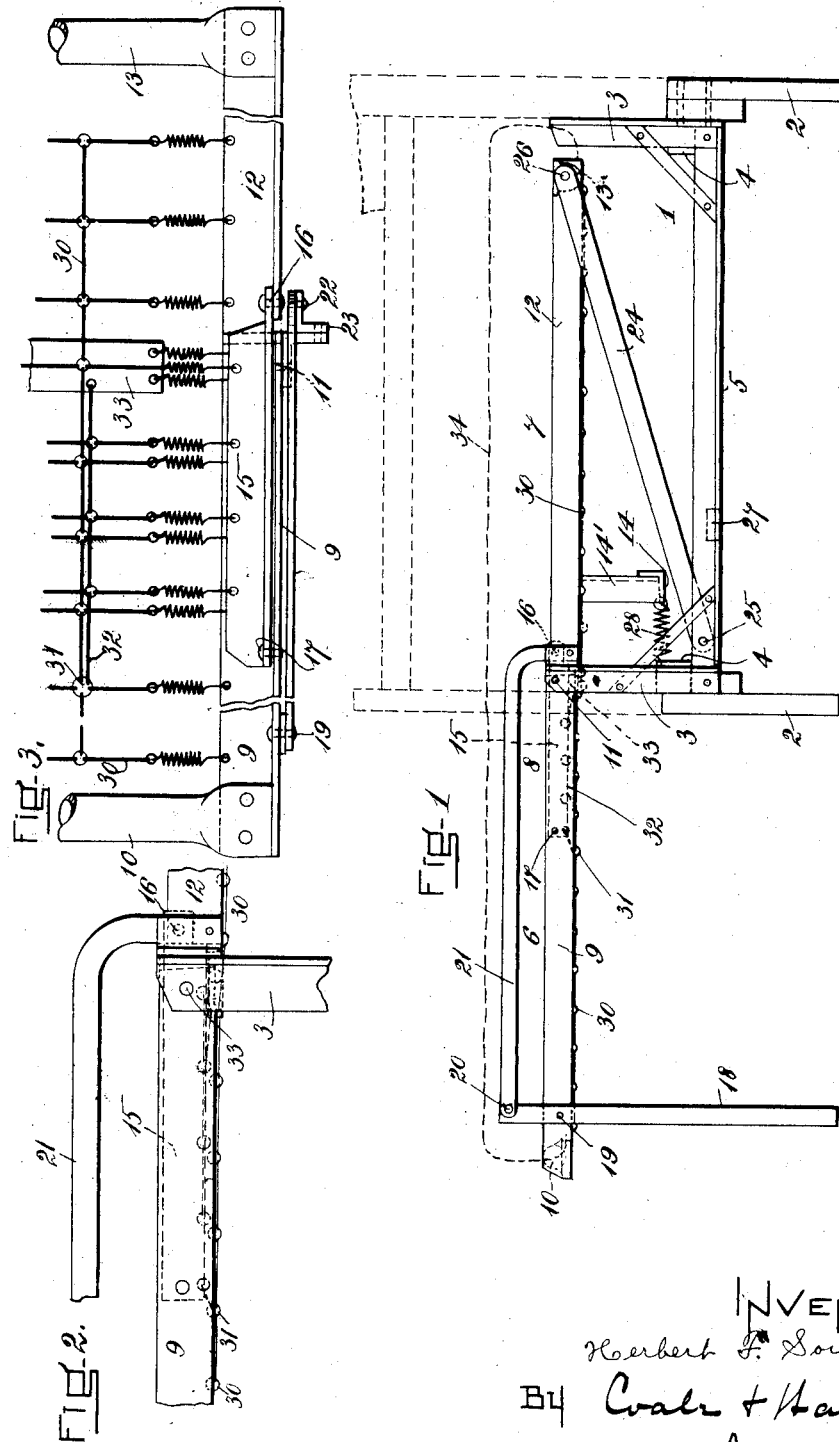

Patented June 5, 1928.

1,672,697

UNITED STATES PATENT OFFICE.

HERBERT F. SOWLE, OF MELROSE, MASSACHUSETTS.

COMBINATION BED AND COUCH.

Application filed August 10, 1925. Serial No. 49,283.

The invention relates to a combination bed and couch in which the bed is convertible into a couch and vice versa the couch is convertible back into a bed.

Among the objects of the invention are the following:—

To provide whereby a single or one-piece spring of wire fabric may be employed in the bed as differentiated from a sectional spring ordinarily employed;

To provide a structure especially useful in the formation of a double bed and in which the spring is reinforced at the centre;

To provide whereby a one-piece mattress used with the bed may, when the bed is converted into a couch, be folded to lie within the spring inside the couch;

To provide whereby the couch after the folding of the spring will have a properly defined front edge for its seat.

Especially is it the object of the invention to provide a combination bed and couch having a very simple construction, composed of relatively few parts, and various of which parts, on account of their form and arrangement, perform different functions in the converted bed or couch and assist in the conversion of the one into the other.

The invention can best be seen and understood by reference to the drawings, in which—

Figure 1 is a side elevation of the structure open as a bed.

Fig. 2 is an elevation in enlarged detail of a portion of the structure shown in Fig. 1.

Fig. 3 is a plan in enlarged detail of a portion of the structure shown in Fig. 1.

Fig. 4 is a side elevation of the structure converted into a couch, and

Fig. 5 is a side elevation in enlarged detail of a portion of the structure shown in Fig. 4.

1 represents the body or that part of the combination structure which carries the convertible parts and which rests within a base 2. The body comprises an open rectangular frame having upright corner posts 3, connecting side bars 4 and end bars 5, all preferably of angle iron.

6, 7 and 8 represent respectively spring-carrying sections. Of these, the section 6 comprises a spring-carrying frame consisting of end bars 9 and a side bar 10 connecting one end of the respective end bars. The opposite ends of the end bars 9 are pivoted respectively by pivotal connections 11 to the front corner posts 3 of the body on which they may turn and the section 6 assume an outturned horizontal position forming the outer half of the bed as shown in Fig. 1 or an inturned horizontal position forming the seat of the couch as shown in Fig. 3.

The section 7 comprises a spring-carrying frame consisting of end bars 12 and a side bar 13 connecting the respective end bars at one end thereof. The end bars 12 are also preferably connected and reinforced by an underslung bar 14 secured to the respective end bars by short bar sections 14'. The opposite free ends of the end bars 12 are pivotally connected to the end bars 9 of the spring-carrying section 6 by means of the frame of the spring-carrying section 8 which comprises relatively short end bars 15 the inner ends of which are pivoted respectively to the forward ends of the end bars 12 of the spring-carrying section 7 by means of pivotal connections 16. The outer ends of the bars 15 are pivoted to the sides of the end bars 9 of the spring-carrying section 6 by pivotal connections 17 which lie some little distance inwardly removed from the inner ends of the bars 9.

Thus pivotally connected the spring-carrying frames may all be turned to occupy horizontally aligned positions when the end bars 15 constituting the frame of the spring-carrying section 8 will rest upon the end bars 9 of the spring-carrying section 6 (see Fig. 1). When thus horizontally aligned the respective spring-carrying sections 6, 7 and 8 form the bed, the section 6 forming the outer half thereof, the section 7 the inner half thereof and the section 8 an intermediate portion, though the section 8 is especially useful in the formation of the couch to which attention will later be directed.

When the section 6 is outturned horizontally in the formation of the bed, the outer end of this section is supported by legs 18. These legs are pivoted respectively to the end bars 9 of the section 6 by pivotal connections 19, the legs extending upwardly by these pivotal connections. Pivotally secured by connections 20 to the upper ends of the legs are links 21 which extend inwardly in a horizontal direction and are turned to have engagement by pivotal connections 22 with ears 23 on the front corner posts 3 of the body of the structure.

When inturned and horizontally positioned in the formation of the bed, the inner end of the spring-carrying section 7 is supported by braces 24. These braces are secured at one end by pivotal connections 25 to the end bars 5 of the body 1, and at their opposite ends to the end bars 12 of the section 7 by pivotal connections 26 just inwardly removed from the inner ends of these bars.

Assuming now that the section 6 is turned pivotally from its outturned horizontal position as shown in Fig. 1 to its inturned horizontal position as shown in Fig. 3: When thus inturned the section 6 forms the seat of the couch and the pivotal arrangements of the various sections are such that when the section 6 is thus turned over to form the seat of the couch the end bars 12 of the spring-carrying section 8 operating as levers will move the frame of the spring-carrying section 7 downward into a lowered position beneath the seat of the couch substantially as shown in Fig. 3, gravity also assisting in this operation. The lowering of the section 7 will continue until the end bars 12 of this section encounter fixed stops 27 on the end bars 5 of the body, and such engagement will take place precisely when the spring-carrying section 6 has been turned into a horizontal position for forming the seat of the couch. The end pieces 15 of the spring-carrying section 8 will then assume an inclined position as shown in Fig. 3 forming braces between the spring-carrying sections 6 and 7 for supporting the spring-carrying section 6 in its horizontal position when forming the seat of the couch. The legs 18 will occupy folded positions alongside the end bars 9 of the section 6 and the braces 24 will fold alongside the end bars 12 of the section 7.

To form the bed the operation is reversed. The spring-carrying section 6 is turned outwardly into a horizontal position. During this operation the frame 15 of the spring-carrying section 8 operating as lifting bars, will elevate the spring-carrying section 7 into a position where it is in horizontal alignment with the spring-carrying section 6, all the spring-carrying sections then being in horizontal alignment with one another forming the bed. During the operation of elevating the spring-carrying section 7 the inner end of this section will be supported by the brace 24, the brace continuing to support the inner end of this section when elevated into an aligned position with the other sections as aforesaid. With the sections thus horizontally aligned the inner end of the spring-carrying section 7 will be supported by the frames 15 of the spring-carrying section 8 which rest upon the end bars 9 of the spring-carrying section 6 as above explained. The outer end of the spring-carrying section 6 will be supported by the legs 18 which will turn down into operative position as the spring-carrying section 6 is turned outwardly.

To assist in the elevation of the spring-carrying section 7 during the formation of the bed there is preferably employed a coiled spring 28 fastened to the side bar 4 of the body 1 and connecting with the underslung frame bar 14 of the spring-carrying section 7. When the spring-carrying section 7 is lowered to form the couch this spring is distorted by extension and upon the elevation of the spring-carrying section 7 in the formation of the bed the draft of the spring will assist in the elevation of the section.

The arrangement of the various spring-carrying sections is such that a main single fabric spring is employed in the formation of the bed. 30 represents such fabric spring which is connected to the frame bars of all the spring-carrying sections 6, 7 and 8 substantially as shown in Fig. 1. In this connection it will be observed that the spring extended from the outer end of the spring-carrying section 6 and connected to the side and end bars thereof leaves this section at the point 31 some little distance removed from the inner end of the section and connects with the end bars 15 of the spring-carrying section 8, afterward leaving these bars and connecting with the side and end bars of the spring-carrying section 7.

There is also employed an auxiliary spring section 32. This section extends from the point 31 on the spring 30, being connected thereto, thence extends inwardly along the side bars 9, with which it connects, to the inner end of the spring-carrying section 6 (see Fig. 1) where the spring is provided with an edge bar 33 of spring metal.

With the spring-carrying sections 6, 7 and 8 in alignment with one another, the main spring 30 will form the spring of the bed supporting a mattress 34. The auxiliary spring 32 will then be extended under the spring 30 reinforcing the main spring and is especially useful in this connection when the bed is a double bed. When the positions of the spring-carrying sections become changed as aforesaid to form the bed into a couch the main spring 30 will become folded into a position substantially as shown in Figs. 3 and 4 and the mattress 34 will become folded to lie within this spring. That portion of the main spring carried by the side and end bars of the spring-carrying section 6 lying forward of the point 31 in the bed as shown in Fig. 1 will form the rear portion of the seat of the couch while the auxiliary spring 32 will form the front portion thereof which is reinforced by the edge bar 33 with which this section is provided.

Having thus fully described my invention, I claim and desire to secure by Letters Patent of the United States:—

1. In a convertible bed and couch, the combination comprising a supporting body, separate spring-carrying sections comprising a swinging section and a movable up-and-down section, means for pivoting the swinging section to said body whereby it will have either an outturned or an inturned position with relation to the body, means for connecting the swinging section to the movable up-and-down section whereby as the swinging section is turned outwardly the movable up-and-down section will be moved into a raised position and co-operate with the swinging section for forming a bed and when the swinging section is turned inwardly it will assist in forming the seat of a couch while the movable up-and-down section will be moved to occupy a lowered position beneath the swinging section, spaced therefrom, and the said means connecting the two sections will occupy a position between them, a main spring connected to a part of said swinging section and to said movable up-and-down section whereby it will form a one-piece spring for the bed when the spring-carrying sections are in their bed-forming positions as aforesaid and will assist in forming the rear end portion of the couch seat and a fold beneath said seat when the spring-carrying sections are in their couch-forming positions as aforesaid, and an auxiliary spring connected to said swinging section and arranged whereby it will lie beneath said main spring substantially parallel therewith and closely adjacent thereto, reinforcing it when the spring-carrying sections are in their bed-forming positions as aforesaid and will form the front portion of the couch seat when the spring-carrying sections are in their couch-forming positions as aforesaid.

2. In a convertible bed and couch, the combination comprising a supporting body, separate spring-carrying sections comprising a swinging section, a movable up-and-down section and a connecting section, means for pivoting the swinging section to said body whereby it will have either an outturned or an inturned position with relation to the body, means for pivoting the connecting section to the swinging section and movable up-and-down section respectively whereby as the swinging section is turned outwardly the movable up-and-down section will be moved into a raised position to co-operate with the swinging section for forming a bed and when the swinging section is turned inwardly it will assist in forming the seat of a couch while the movable up-and-down section will be moved to occupy a lowered position beneath the swinging section, spaced therefrom, and the connecting section will be moved to occupy a position between the swinging section and the movable up-and-down section, a main spring connected to a part of said swinging section, to said connecting section and to said movable up-and-down section whereby it will form a one-piece spring for the bed when the spring-carrying sections are in their bed-forming positions as aforesaid and will assist in forming the rear end portion of the couch seat and a fold beneath said seat when the spring-carrying sections are in their couch-forming positions as aforesaid, and an auxiliary spring connected to said swinging section and arranged whereby it will lie beneath said main spring substantially parallel therewith and closely adjacent thereto, reinforcing it when the spring-carrying sections are in their bed-forming positions as aforesaid and will form the front portion of the couch seat when the spring-carrying sections are in their couch-forming positions as aforesaid.

3. In a convertible bed and couch, the combination comprising a supporting body, separate spring-carrying sections comprising a swinging section and a movable up-and-down section, means for pivoting the swinging section to said body whereby it will have either an outturned or an inturned position with relation to the body, means for connecting the swinging section to the movable up-and-down section whereby as the swinging section is turned outwardly the movable up-and-down section will be moved into a raised position and co-operate with the swinging section for forming a bed and when the swinging section is turned inwardly it will assist in forming the seat of a couch while the movable up-and-down section will be moved to occupy a lowered position beneath the swinging section, spaced therefrom, and the said means connecting the two sections will occupy a position between them, a main spring connected to a part of said swinging section and to said movable up-and-down section whereby it will form a one-piece spring for the bed when the spring-carrying sections are in their bed-forming positions as aforesaid and will assist in forming the rear end portion of the couch seat and a fold beneath said seat when the spring-carrying sections are in their couch-forming positions as aforesaid, an auxiliary spring connected to said swinging section and arranged whereby it will lie beneath said main spring substantially parallel therewith and closely adjacent thereto, reinforcing it when the spring-carrying sections are in their bed-forming positions as aforesaid and will form the front portion of the couch seat when the spring-carrying sections are in their couch-forming positions as aforesaid, and an edge bar of spring metal reinforcing said auxiliary spring.

4. In a convertible bed and couch, the combination comprising a supporting body, separate spring-carrying sections comprising a swinging section and a movable up-and-down section, means for pivoting the swinging section to said body whereby it will have either an outturned or an inturned position with relation to the body, means for connecting the swinging section to the movable up-and-down section whereby as the swinging section is turned outwardly the movable up-and-down section will be moved into a raised position and co-operate with the swinging section for forming a bed and when the swinging section is turned inwardly it will assist in forming the seat of a couch while the movable up-and-down section will be moved to occupy a lowered position beneath the swinging section, spaced therefrom, and the said means connecting the two sections will occupy a position between them, a main spring connected to a part of said swinging section and to said movable up-and-down section whereby it will form a one-piece spring for the bed when the spring-carrying sections are in their bed-forming positions as aforesaid and will assist in forming the rear end portion of the couch seat and a fold beneath said seat when the spring-carrying sections are in their couch-forming positions as aforesaid, and an auxiliary spring connected to said swinging section and to said main spring and arranged whereby it will lie beneath said main spring substantially parallel therewith and closely adjacent thereto, reinforcing it when the spring-carrying sections are in their bed-forming positions as aforesaid and will form the front portion of the couch seat when the spring-carrying sections are in their couch-forming positions as aforesaid.

HERBERT F. SOWLE.